(12) United States Patent
Fukano et al.

(10) Patent No.: US 12,504,681 B2
(45) Date of Patent: Dec. 23, 2025

(54) SPATIAL PROJECTION APPARATUS, SPATIAL PROJECTION SYSTEM, AND SPATIAL PROJECTION METHOD

(71) Applicant: CASIO COMPUTER CO., LTD., Tokyo (JP)

(72) Inventors: Kazuyasu Fukano, Hachioji (JP); Masaki Kobayashi, Higashiyamato (JP); Tetsuro Narikawa, Hamura (JP); Shunsuke Hara, Fuchu (JP)

(73) Assignee: CASIO COMPUTER CO., LTD., Tokyo (JP)

(*) Notice: Subject to any disclaimer, the term of this patent is extended or adjusted under 35 U.S.C. 154(b) by 132 days.

(21) Appl. No.: 18/463,367

(22) Filed: Sep. 8, 2023

(65) Prior Publication Data

US 2023/0418146 A1  Dec. 28, 2023

Related U.S. Application Data

(63) Continuation of application No. PCT/JP2022/005284, filed on Feb. 10, 2022.

(30) Foreign Application Priority Data

Mar. 11, 2021 (JP) .................................. 2021-038821
Sep. 2, 2021 (JP) .................................. 2021-142851

(51) Int. Cl.
*G03B 21/60* (2014.01)
*G03B 21/28* (2006.01)

(52) U.S. Cl.
CPC ............. *G03B 21/60* (2013.01); *G03B 21/28* (2013.01)

(58) Field of Classification Search
CPC ........ G03B 21/60; G03B 21/28; G02B 30/56; H04N 13/363; H04N 13/388
See application file for complete search history.

(56) References Cited

U.S. PATENT DOCUMENTS 6,364,490 B1 * 4/2002 Krause .................. G03B 21/28
353/77
11,843,902 B2 * 12/2023 Narikawa ............ G03B 21/142
(Continued)

FOREIGN PATENT DOCUMENTS

| CN | 212181239 U | 12/2020 |
| JP | 2006317708 A | 11/2006 |
| JP | 2012008301 A | 1/2012 |

(Continued)

OTHER PUBLICATIONS

Notice of Reasons for Refusal dated Dec. 19, 2023 received in Japanese Patent Application No. JP 2021-142851.
(Continued)

*Primary Examiner* — Christopher E Mahoney
(74) *Attorney, Agent, or Firm* — Scully, Scott, Murphy & Presser, P.C.

(57) ABSTRACT

A spatial projection apparatus is provided. The apparatus includes an optical medium that diffuses a projected light. The apparatus further includes a light guide optical system that guides the projected light diffused by the optical medium and forms an image on a spatial imaging unit. The optical medium can be formed with a plate shape, a film shape, a three-dimensional shape including unevenness, in smoke-form, fluid-form, or mist-form.

10 Claims, 6 Drawing Sheets

(56) References Cited

U.S. PATENT DOCUMENTS

2011/0285965 A1* 11/2011 Sugiyama .............. G02B 5/136
                                                    353/10
2021/0302758 A1*  9/2021 Smithwick ......... G02B 27/0093

FOREIGN PATENT DOCUMENTS

| JP | 2013197933 A | 9/2013 |
| JP | 2014016563 A | 1/2014 |
| JP | 2020095101 A | 6/2020 |

OTHER PUBLICATIONS

International Search Report dated May 10, 2022 issued in PCT/JP2022/005284.

* cited by examiner

SPATIAL PROJECTION APPARATUS, SPATIAL PROJECTION SYSTEM, AND SPATIAL PROJECTION METHOD

CROSS-REFERENCE TO RELATED APPLICATIONS

This application is a continuation of International Patent Application No. PCT/JP2022/005284 filed on Feb. 10, 2022, which claims priority to Japanese Patent Applications Nos. 2021-038821 filed on Mar. 11, 2021, and 2021-142851 filed on Sep. 2, 2021; the entire content of each of which is incorporated herein by reference.

TECHNICAL FIELD

The present disclosure relates to a spatial projection apparatus, a spatial projection system and a spatial projection method.

BACKGROUND

Conventionally, a spatial projection technique for forming an image of a projected light in a space and projecting the image has been disclosed. For example, Patent Literature 1 discloses an aerial floating image projection apparatus in which a projection target such as a display image or a real object is disposed in a lower chamber, and an image is projected in the space by a configuration including a first Fresnel lens, a beam splitter, a surface reflecting mirror, and a second Fresnel lens.

CITATION LIST

Patent Literature

Patent Literature 1: JP 2006-317708 A

DESCRIPTION OF EMBODIMENTS

First Exemplary Embodiment

Figure 1:
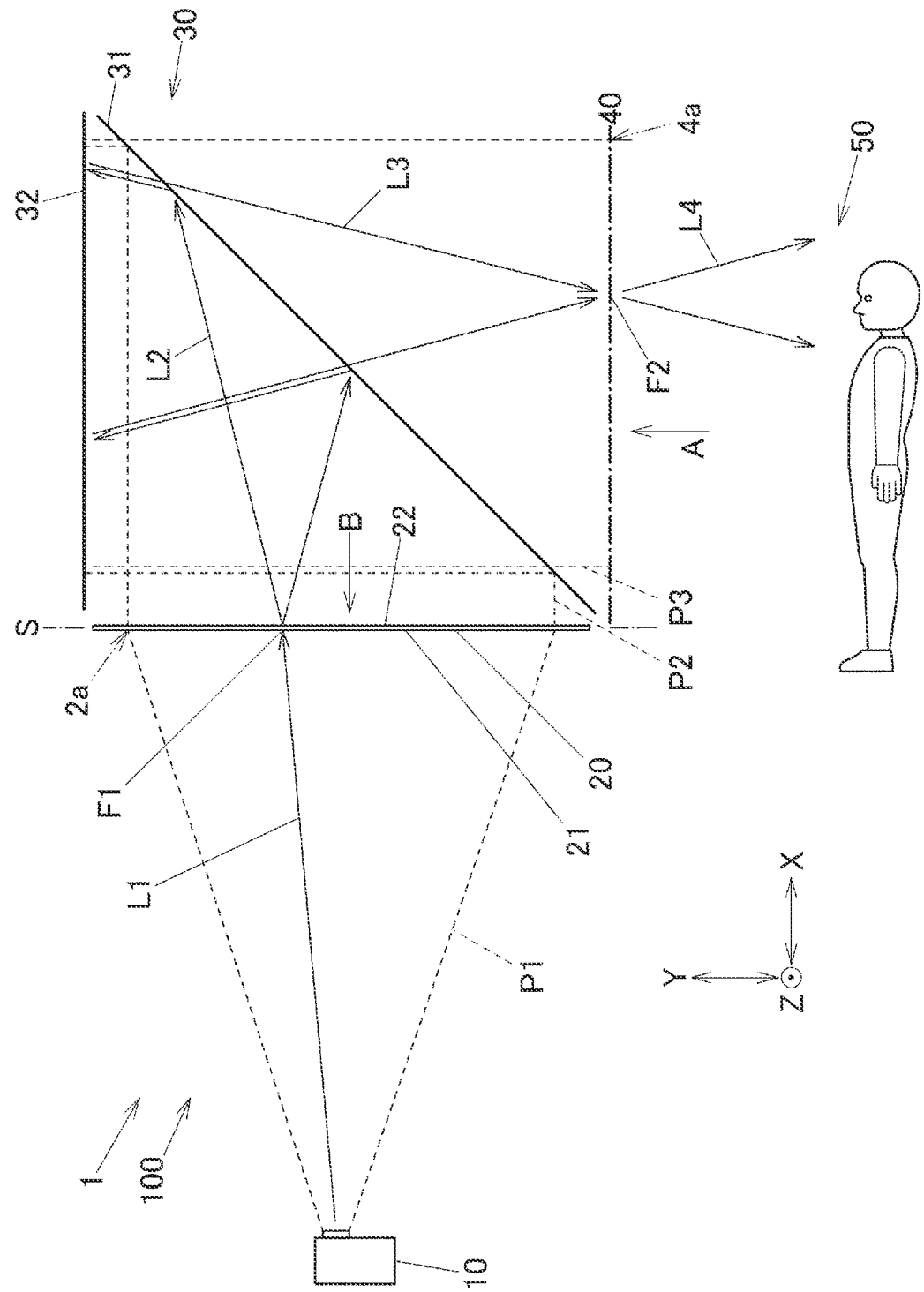
FIG. 1 is a schematic plan view of a spatial projection apparatus according to a first exemplary embodiment.

Hereinafter, exemplary embodiments for implementing the present disclosure are described. FIG. 1 is a schematic plan view of a spatial projection apparatus 100 in a spatial projection system 1. The spatial projection apparatus 100 includes a projection device 10 (projector), an optical medium 20 on which a projected light P1 emitted from the projection device 10 is irradiated (projected), formed into an image, and diffused, a light guide optical system 30 that guides a light beam projected and diffused on the optical medium 20, and a spatial imaging unit 40 in which a light beam guided by the light guide optical system 30 is reimaged in a space. In the spatial projection apparatus 100, a projection image 2a emitted from the projection device 10, projected on the optical medium 20 and formed into an image, is diffused from the optical medium 20, transmitted (emitted), and is incident on the light guide optical system 30, and formed into an image on the spatial imaging unit 40 by the light guide optical system 30, as a result, a viewer 50 can visually recognize a spatial projection image 4a floating in air.

Figure 2:
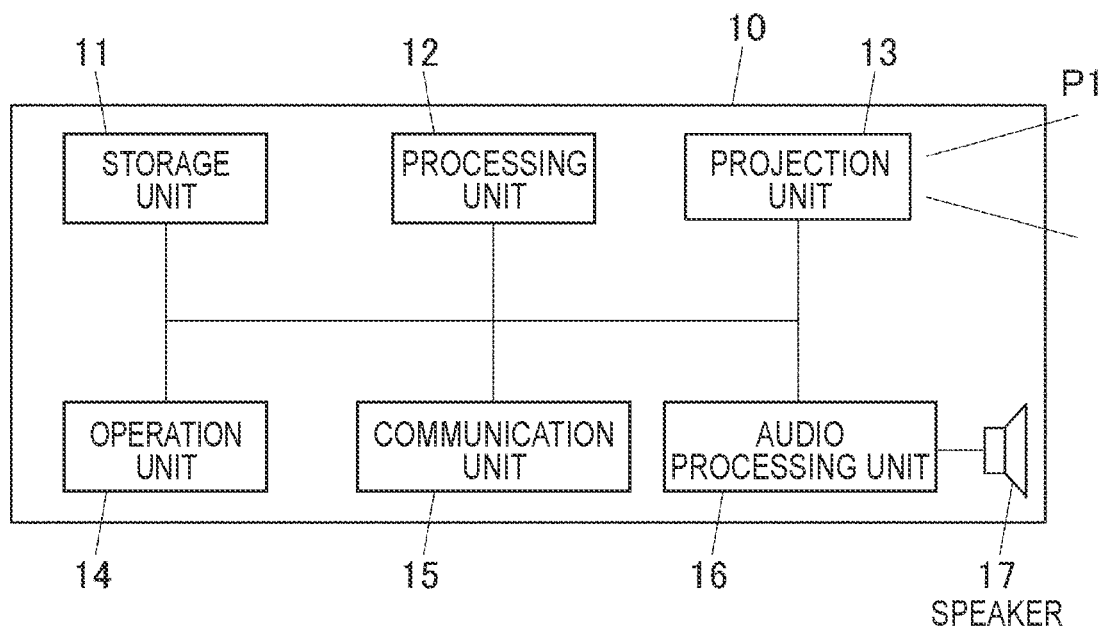
FIG. 2 is a diagram illustrating a configuration of a projection device according to the first exemplary embodiment.

A configuration of the projection device 10 is described with reference to FIG. 2. The projection device 10 includes a storage unit 11, a processing unit 12, a projection unit 13, an operation unit 14, a communication unit 15, and an audio processing unit 16, which are connected by an internal bus. The storage unit 11 includes, for example, a solid state drive (SSD) or a static random access memory (SRAM). The storage unit 11 stores data such as image data, moving image data, and a control program (not illustrated). The processing unit 12 includes a CPU, a microcomputer, and the like, reads the control program stored in the storage unit 11, and controls the projection device 10.

The projection unit 13 forms an image of the image data sent from the processing unit 12 at a frame rate according to a preset image format, and emits the image to an outside as the projected light P1. The projection device 10 according to the present exemplary embodiment is a Digital Light Processing (DLP) type projection device. The projection unit 13, for example, irradiates a digital micromirror device (DMD) as a display element with a blue wavelength band light, a green wavelength band light, and a red wavelength band light emitted by an internal light source device, and the DMD reflects the blue wavelength band light, the green wavelength band light, and the red wavelength band light in a time division manner for each micromirror (or for each pixel), thereby forming a color image light. The image light is emitted to the outside through a projection lens in the projection unit 13 as the projected light P1 of the projection device 10. The projected light P1 (image light) emitted from the projection unit 13 is projected onto the optical medium 20 in FIG. 1.

The operation unit 14 receives an operation signal from an operation key or the like provided in a housing of projection device 10, and transmits the operation signal to the processing unit 12 via a bus. The processing unit 12 executes various functions such as projection processing according to an operation signal from the operation unit 14.

The communication unit 15 receives an operation signal by an infrared modulation signal or the like from a remote controller (not illustrated), and transmits the operation signal to the processing unit 12. The communication unit 15 may include an external input terminal, and can input image data from an external device.

The audio processing unit 16 includes a sound source circuit such as a PCM sound source, and drives a speaker 17 to diffuse and emit sound. In a case where the image data to be projected includes an audio signal, the audio processing unit 16 performs analog conversion on the audio signal at the time of the projection operation and outputs a sound via the speaker 17.

The optical medium 20 has an arbitrary shape and size including a projection range of the projected light P1. Alternatively, the optical medium 20 is disposed at an arbitrary position including the projection range of the projected light P1. The optical medium 20 in FIG. 1 is configured as a flat plate shape or film shape transmission-type screen. The optical medium 20 is a transmissive member that diffuses and emits a spatial projected light P2 (including a light beam L2) from a second surface 22 side, which is a surface opposite to a first surface 21, toward the light guide optical system 30 when the projected light P1 (including a light beam L1) emitted from the projection device 10 is irradiated to form an image on the first surface 21 side facing the projection device 10.

The light guide optical system 30 is provided on the second surface 22 side of the optical medium 20 and includes a beam splitter 31 and a retroreflective member 32 (retroreflective mirror). The retroreflective member 32 is disposed to be perpendicular to a disposition surface S (surface including a Y direction (front-rear direction) and a Z direction (up-down direction) in FIG. 1) of the optical medium 20. The beam splitter 31 is formed in a flat plate shape, and is disposed to be inclined at 45 degrees with respect to the disposition surface S of the optical medium 20 and the retroreflective member 32. The beam splitter 31 according to the present exemplary embodiment is a half mirror that reflects a part of incident light and transmits the other part. The retroreflective member 32 has a mirror surface that reflects an incident light in a direction (opposite direction) opposite to an incident direction.

The spatial imaging unit 40 is a spatial region in which the spatial projection image 4a is displayed by being reimaged by the light guide optical system 30 after the projection image 2a projected and formed into an image on the optical medium 20 and diffused is diffused and emitted from the optical medium 20 as the spatial projected light P2 (P3).

Next, a spatial projection method in the spatial projection apparatus 100 (spatial projection system 1) is described. The light beam L1 emitted from a point light source (an arbitrary point on a micromirror in a DMD (display element)) in the projection device 10 (in the projection unit 13) through a projection lens forms an image at a focal point F1 on the optical medium 20. The optical medium 20 is irradiated with a light emitted from a point light source in the projection device 10 through an optical path exemplified by the light beam L1 over an irradiation range of the projected light P1 and formed into an image. As a result, the projection image 2a is projected on the optical medium 20. Although only one focal point F1 is illustrated in FIG. 1, actually, a large number of focal points F1 exist in the Z direction and the Y direction (that is, an irradiation range of the projected light P1).

Light at an arbitrary point constituting the projection image 2a projected and formed on the first surface 21 of the optical medium 20 is transmitted to the second surface 22, diffused from the second surface 22 at a predetermined diffusion angle, and emitted. For example, the light beam L1 formed into an image at focal point F1 described above is diffused as the light beam L2 at a predetermined diffusion angle and enters the beam splitter 31. Part of the light beam L2 is reflected by the beam splitter 31 toward the retroreflective member 32. That is, the light beam L2 emitted from a point light source of the projection image 2a is guided as a diffused light in an optical path from the optical medium 20 to the retroreflective member 32. Since the retroreflective member 32 reflects an incident light in a direction (opposite direction) opposite to an incident direction, the light beam L2 incident on the retroreflective member 32 is reflected toward the beam splitter 31 as a collecting light collected at an angle identical to a diffusion angle. The light beam L3 reflected by the retroreflective member 32 is partially transmitted by the beam splitter 31 and guided to the spatial imaging unit 40 side. Then, in the spatial imaging unit 40, the light beam L3 forms an image again at focal point F2. Note that an optical path length of the light beam L2 and an optical path length of the light beam L3 are substantially identical.

Then, the light beam L3 formed into an image at focal point F2 of the spatial imaging unit 40 is guided as a light beam L4 having a diffusion angle similar to a collecting angle of the light beam L3 and a diffusion angle of the light beam L2.

The light beams L1 to L4 from the point light source in the display element in the projection device 10 as described above is guided over an effective area of an optical path of the optical medium 20 and the light guide optical system 30. That is, the projected light P1, which is a set of light beam L1 from the point light source emitted from the projection device 10, is irradiated to the first surface 21 of the optical medium 20 from a side of the first surface 21, and an image is formed on the first surface 21 of the optical medium 20. The projected light P1 irradiated to the first surface 21 of the optical medium 20 is diffused and emitted from the second surface 22 toward the beam splitter 31 as the spatial projected light P2 that is a set of light beam L2. Part of light of the spatial projected light P2 irradiated to the beam splitter 31 is reflected toward the retroreflective member 32. The retroreflective member 32 reflects the spatial projected light P2 guided from the beam splitter 31 side as the spatial projected light P3 (a set of light beam L3). Part of light of the spatial projected light P3 reflected by the retroreflective member 32 is transmitted through the beam splitter 31 and guided toward the spatial imaging unit 40.

Thus, a light (a set of point light sources) constituting the projection image 2a formed into an image on the optical medium 20 is reimaged on the spatial imaging unit which is a spatial projection surface and emitted toward the viewer 50. Therefore, the viewer 50 can visually recognize the spatial projection image 4a formed into an image in the air on the spatial imaging unit 40. Furthermore, the viewer 50 can visually recognize the spatial projection image 4a even when an observation point is moved. For example, the light beam L4 emitted from the focal point F2 can be visually recognized at a position within a diffusion angle range (emission angle range) of the light beam L4 illustrated in FIG. 1.

Further, the vertical direction (Z direction) and a horizontal direction (X direction) of the spatial projection image 4a viewed from an A direction which is the direction from the viewer 50 side to the spatial imaging unit 40 side are substantially identical to the vertical direction (Z direction) and the front-rear direction (Y direction) of the projection image 2a viewed from a B direction. Alternatively, since optical path lengths of the light beam L2 and the light beam L3 are substantially identical, a depth position of the spatial projection image 4a viewed from the A direction has a relationship opposite to a depth position of the projection image 2a viewed from the B direction (described later with reference to FIG. 3). When the optical medium 20 provided in a flat shape in FIG. 1 is used, the spatial projection image 4a is also displayed as a flat planar image.

Figure 3:
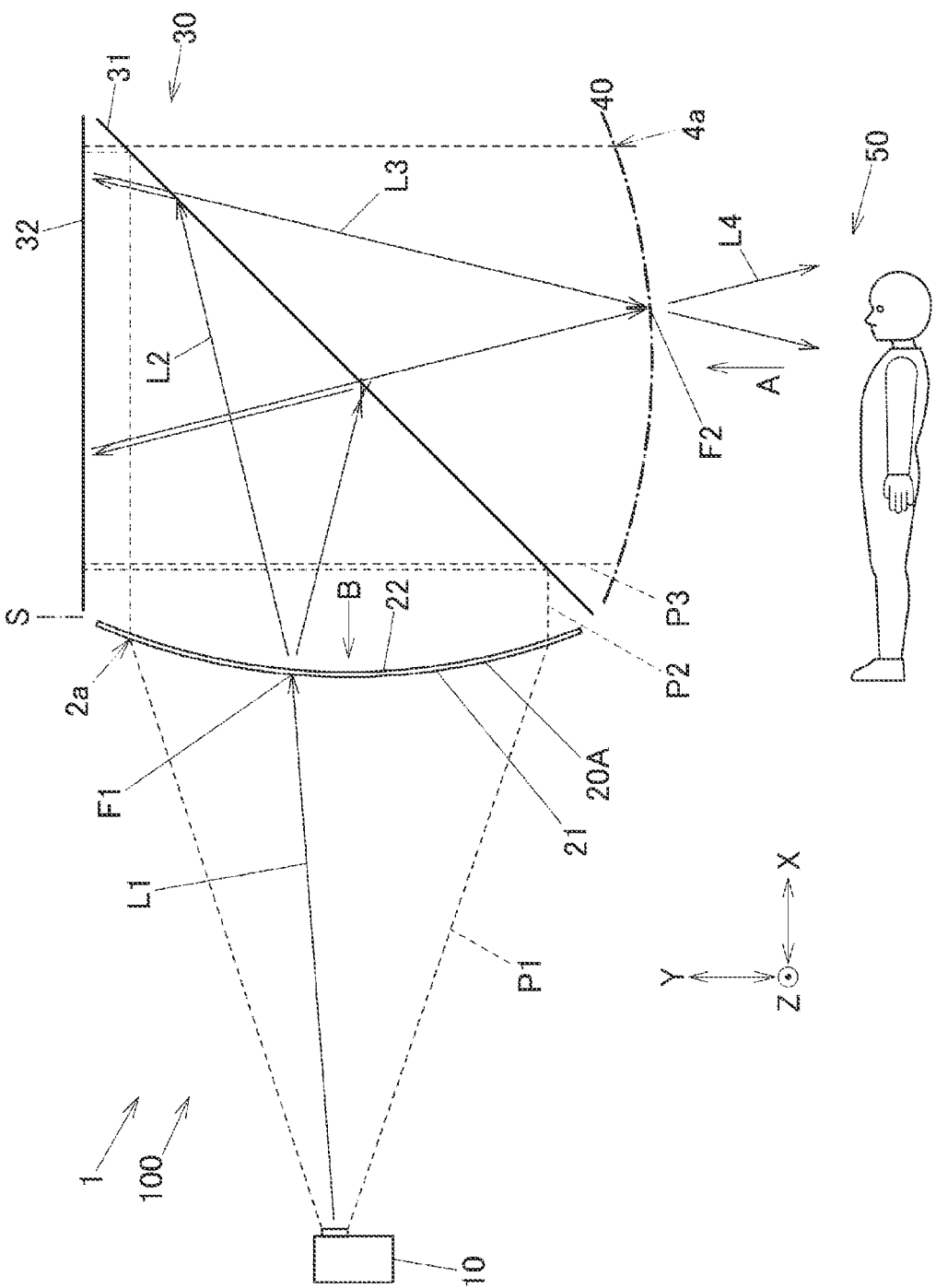
FIG. 3 is a schematic plan view in which another optical medium is applied to the spatial projection apparatus according to the first exemplary embodiment.

Next, a configuration in a case where an optical medium 20A including a curved surface is used instead of the optical medium 20 is described with reference to FIG. 3. The optical medium 20A has a shape different from that of the optical medium 20, but other functions such as emitting the projected light P1 (or the light beam L1) irradiated from the first surface 21 side to the second surface 22 side are configured similarly to the optical medium 20.

The optical medium 20A is formed into a three-dimensional plate shape or film shape protruding toward the first surface 21 side and curved around an axis in the vertical direction (Z direction) so that the second surface 22 side is recessed. A degree of unevenness of the optical medium 20A is configured to be within a depth of field of the projected light P1 (light beam L1) emitted from the projection device 10. Therefore, a projection image 2a focused (alternatively, a projection image 2a formed to a degree that can be regarded as being in focus) is displayed on the optical medium 20A. The focal point F1 formed by the light beam L1 formed into an image on the optical medium 20A is located on the far side when the second surface 22 is viewed from the B direction.

As described above, optical path lengths of the light beam L2 and the light beam L3 guided by the light guide optical system 30 are substantially identical, and a depth position of the spatial projection image 4a viewed from the A direction has a relationship opposite to a depth position of the projection image 2a viewed from the B direction. That is, as illustrated in FIG. 3, the focal point F1 located on a far side of the curved projection image 2a viewed from the B direction corresponds to the focal point F2 located on a front side of the spatial projection image 4a viewed from the A direction. Therefore, by forming the optical medium 20A in a three-dimensional plane shape including unevenness, a three-dimensional spatial projection image 4a can be projected on the spatial imaging unit 40.

For example, in a case where a large number of viewers 50 view the optical medium 20A side by side (X direction), the optical medium 20A is formed into a convex shape along the Y direction protruding toward the projection device 10, thereby any viewers 50 at any position among the viewers 50 disposed side by side can visually recognize the spatial projection image 4a with substantially identical appearance. Similarly, in a case where a large number of viewers 50 line up in the height direction (Z direction) to view, the optical medium 20A may have a convex shape along the Z direction, and in a case where a large number of viewers 50 line up in the lateral and height directions (for example, in a theater) to view, the optical medium 20A may have a spherical shape.

As described above, in the spatial projection apparatus 100 according to the present exemplary embodiment, the projection image 2a to be projected as the spatial projection image 4a is formed by the projection device 10. Therefore, it is possible to display the projection image 2a with high luminance as compared with the case of using a display image or a real object as a projection target, and it is possible to clearly display the spatial projection image 4a with high luminance. In addition, in the projection image 2a projected by the projection device 10, the spatial projection image 4a can be easily enlarged by enlarging shapes of the optical media 20 and 20A and appropriately setting a distance between the projection device 10 and the optical media 20 and 20A. Therefore, the spatial projection apparatus 100 can largely project the spatial projection image 4a without largely changing an overall configuration. Thus, the spatial projection method using the spatial projection apparatus 100 (spatial projection system 1) enables spatial projection with a simple configuration and a high visual effect.

Second Exemplary Embodiment

Figure 4:
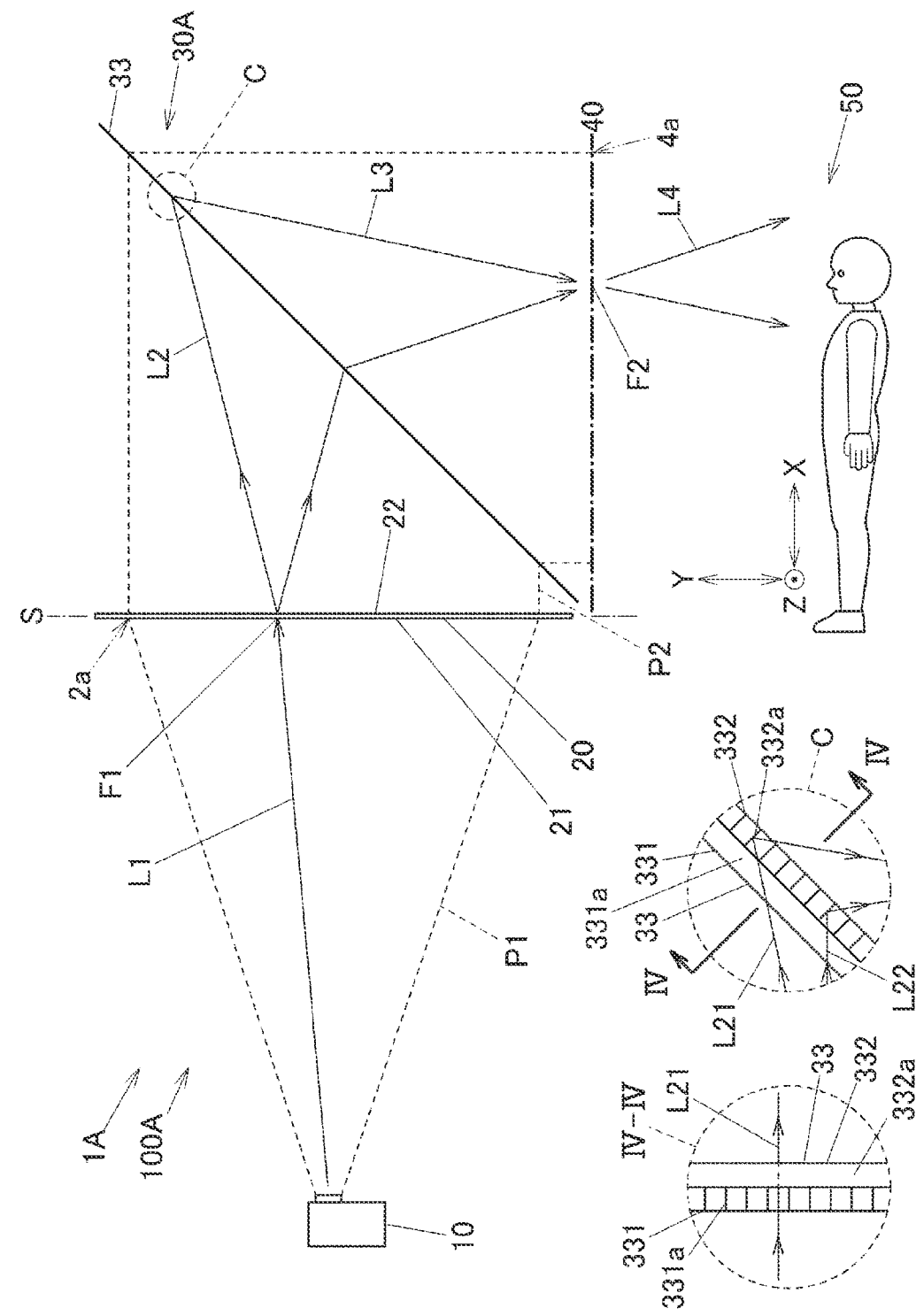
FIG. 4 is a schematic plan view of a spatial projection apparatus according to a second exemplary embodiment.

Next, a second exemplary embodiment is described. A spatial projection apparatus 100A in a spatial projection system 1A illustrated in FIG. 4 includes a light guide optical system 30A including a light reflection member 33 instead of the light guide optical system 30 in the spatial projection apparatus 100 according to the first exemplary embodiment. The light reflection member 33 is an optical member that forms again an image of each point light source (for example, light from a focal point F1) formed into an image on an optical medium 20 on a spatial imaging unit 40 that is a plane-symmetric position.

Any configuration can be applied to the light reflection member 33, but for example, as illustrated in an enlarged view of portion C, a first mirror layer 331 including a plurality of first mirrors 331a and a second mirror layer 332 including a plurality of second mirrors 332a are configured to be adjacent to each other. The first mirror 331a is disposed such that a mirror surface is parallel to an XY plane. The plurality of first mirrors 331a are arranged at equal intervals in the Z direction to be parallel to each other (see also a cross-sectional view taken along line IV-IV). The second mirror 332a is disposed such that a mirror surface is orthogonal to a mirror surface of the first mirror 331a. The plurality of second mirrors 332a are arranged at equal intervals in a direction orthogonal to the direction in which the first mirrors 331a are arranged to be parallel to each other. The light reflection member 33 is disposed such that the second mirror 332a is inclined by 45 degrees with respect to a disposition surface S of the optical medium 20 (according to the present exemplary embodiment, with respect to a YZ plane and a ZX plane).

Furthermore, an enlarged view of portion C illustrates an optical path in a case where light beams L21 and L22, which are emitted from the focal point F1 and are parallel to the XY plane, are incident on the light reflection member 33. The light beam L21 and the light beam L22 are incident on the mirror surface of the second mirror 332a without being irradiated to the mirror surface of the first mirror 331a arranged parallel to the XY plane. The light beam L21 and light beam L22 are each reflected at the same reflection angle as an incident angle when entering the second mirror 332a. Since the light beam L21 is incident on the second mirror 332a (light reflection member 33) at an incident angle larger than that of the light beam L22, the light beam L21 is reflected at a reflection angle larger than that of the light beam L22. Therefore, the light beam L2 having a predetermined diffusion angle emitted from the focal point F1 is reflected as a light beam L3 having the same collecting angle as a diffusion angle of the light beam L2 from the light reflection member 33, and an image is formed again at the focal point F2 which is a plane-symmetric position with respect to the light reflection member 33. Since a diffused component in the Z direction of the light beam L2 emitted from the focal point F1 is also reflected by the first mirror 331a, the light beam L2 is formed into an image again at focal point F2.

Note that a configuration of the light reflection member 33 is not limited to the configuration illustrated in the enlarged view of portion C, and another light reflection member that forms an image of each point light source formed on the optical medium 20 again on the spatial imaging unit 40 that is a plane-symmetric position may be used. For example, a light reflection member may be configured to include a plurality of fine prisms, reflect light beams incident at predetermined diffusion angles as a light beam collected at collecting angles substantially the same as the diffusion angles, and emit the light beam incident from the point light source to form an image at a plane-symmetric position.

As described above, in the spatial projection system 1A according to the second exemplary embodiment, since the number of components can be reduced and the configuration can be simplified as compared with the light guide optical system 30 according to the first exemplary embodiment, the entire size can be reduced. Therefore, it is possible to perform spatial projection with a simple configuration and a high visual effect.

Note that, in the spatial projection apparatuses 100 and 100A described in each exemplary embodiment, the projection device 10, the optical medium 20, the light guide optical systems 30 and 30A, and the spatial imaging unit 40 may be disposed in one apparatus, or may be disposed in a plurality of apparatuses in a distributed manner. For example, the projection device 10 can be configured as one spatial projection apparatus including some functions of the optical medium 20, the light guide optical systems 30 and 30A, and the spatial imaging unit 40.

Further, the projection device 10 is not limited to the above DLP type, and may be another method. As the projection device 10, an LCP (liquid crystal panel) type projection device may be used. In LCP type projection device, transmittance of a blue wavelength band light, a green wavelength band light, and a red wavelength band light is controlled for each pixel by a liquid crystal filter (liquid crystal plate), and the blue wavelength band light, the green wavelength band light, and the red wavelength band light of each pixel transmitted through the liquid crystal filter are synthesized and emitted as a projected light.

As the projection device 10, an LCoS (liquid crystal on silicon) type projection device may be used. In the LCoS type projection device, instead of DMD in the DLP type projection device 10, a display element having a liquid crystal filter (liquid crystal layer) capable of varying (including light shielding) light transmittance corresponding to each pixel is disposed on the reflection layer. Therefore, the projection device can reflect the light source light with which the display element is irradiated while controlling an amount of light for each pixel to form an image light, and can emit the image light to the outside as a projected light to project a projection image 2a on the optical media 20 and 20A.

In the example in which the projection device of the above LCP or LCoS type is used as the projection device 10, each light (blue wavelength band light, green wavelength band light, and red wavelength band light) transmitted through a liquid crystal filter is polarized light having a predetermined polarization direction. Therefore, for example, according to the first exemplary embodiment, a polarization mirror that reflects one of S-polarized light and P-polarized light and transmits the other light may be disposed as the beam splitter 31, and a ¼ wavelength plate may be disposed on an optical path between the beam splitter 31 and the retroreflective member 32. As a result, the beam splitter 31 reflects a light in a first polarization direction, which is one of S-polarized light and P-polarized light among light beams emitted from the optical media 20 and 20A, toward the retroreflective member 32 side, transmits the ¼ wavelength plate to be converted into a circularly polarized light, and then is reflected by the retroreflective member 32. The circularly polarized light reflected by the retroreflective member 32 is again transmitted through the ¼ wave plate, converted into a light in a second polarization direction orthogonal to the first polarization direction, and transmitted through the beam splitter 31. As described above, in a case where a polarization mirror is used as the beam splitter 31, most of light beams once reflected by beam splitter can be transmitted through the beam splitter 31 after being reflected by the retroreflective member 32, therefore a utilization efficiency of light can be improved as compared with a case where a half mirror is used.

As the projection device 10, a laser scanning type projection device may be used. In a laser scanning type projection device, a display element is irradiated with a laser beam color-synthesized into a desired color by blue wavelength band light, green wavelength band light, and red wavelength band light, and the display element reflects the laser beam while controlling a reflection angle in a time division manner, and irradiates the optical media 20 and 20A as projection targets with the laser beam. At that time, the display element can irradiate the optical media 20 and 20A with laser beam to scan the optical media two-dimensionally in a vertical direction and a horizontal direction, and project the projection image 2a on the optical media 20 and 20A. In the laser scanning type projection device, since a projection lens that collects beams emitted from the display element can be omitted, an entire projection device can be downsized. In addition, since this projection device can form an image by laser beam, it is possible to project the intended clear projection image 2a even when a three-dimensional optical medium having large unevenness is used.

As the optical media 20 and 20A illustrated according to the present exemplary embodiment, an optical medium configured in a three-dimensional surface shape optionally including a flat portion, a recess, and a convex portion may be used.

As the optical media 20 and 20A, in addition to a plate shape or film shape configuration as exemplified, fluids such as smoke, mist, and water may be used.

The optical media 20 and 20A may be colored. By doing this, for the spatial projection image 4a, a color can be changed or a hue can be arbitrarily adjusted. When a fluid is used as the optical media 20 and 20A, the fluid may be colored. A coloring of the optical media 20 and 20A may be changed over time in time series. By doing this, various performance effects can be expressed.

In addition, the light guide optical system 30 may be configured to form an image again emitted from the optical media 20 and 20A on the spatial imaging unit 40 using a Fresnel lens.

Figure 5:
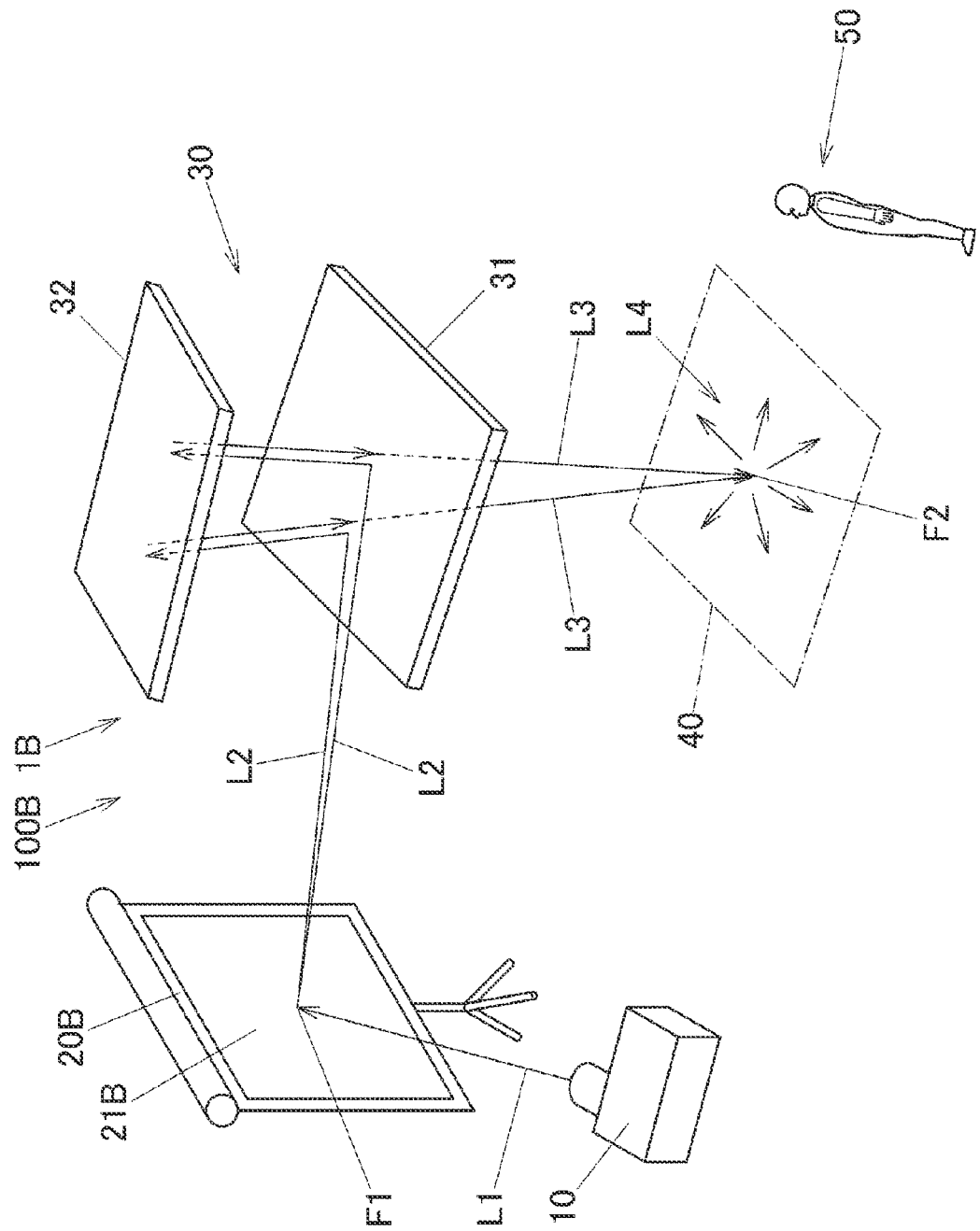
FIG. 5 is a schematic perspective view of a spatial projection apparatus as an optical medium related to a front-type projector screen, instead of an optical medium related to a transmission-type screen in the spatial projection apparatus according to the first exemplary embodiment.

Furthermore, according to the present exemplary embodiment, the optical medium as a transmission-type screen in which the projected light P1 projected on the optical media 20 and 20A is incident from the first surface 21 side of the optical media 20 and 20A, is emitted from the second surface 22 side opposite to the first surface 21, and is guided to the light guide optical system 30 as the spatial projected light P2 has been described as an example. However, a reflective optical medium (projection medium such as a projector screen or a wall surface) in which a surface from which the projected light P1 is emitted and a surface from which the spatial projected light P2 is emitted are identical may be used. For example, a spatial projection system 1B (spatial projection apparatus 100B) illustrated in FIG. 5 projects the light beam L1, which is a projected light from the projection device 10, onto a projection surface 21B of an optical medium 20B serving as a projector screen. Then, an image projected and formed on the projection surface 21B is reflected by the projection surface 21B, diffused as the light beam L2 from the projection surface 21B, and emitted. The light beam L2 is incident on the light guide optical system 30 (the beam splitter 31 and the retroreflective member 32), and is reimaged by the spatial imaging unit 40 as the light beam L3.

In addition, the projection image 2a formed on the optical media 20 and 20A by the projected light P1 is not limited to an image by a projected light emitted from the projection device 10, and may be a light image by any light source light, illumination light, LED light, or laser beam emitted as projected light from another light source device. Furthermore, the projection image 2a may be formed with a visible light or an invisible light (for example, applications such as electronic watermarks) by using an arbitrary light source.

Figure 6:
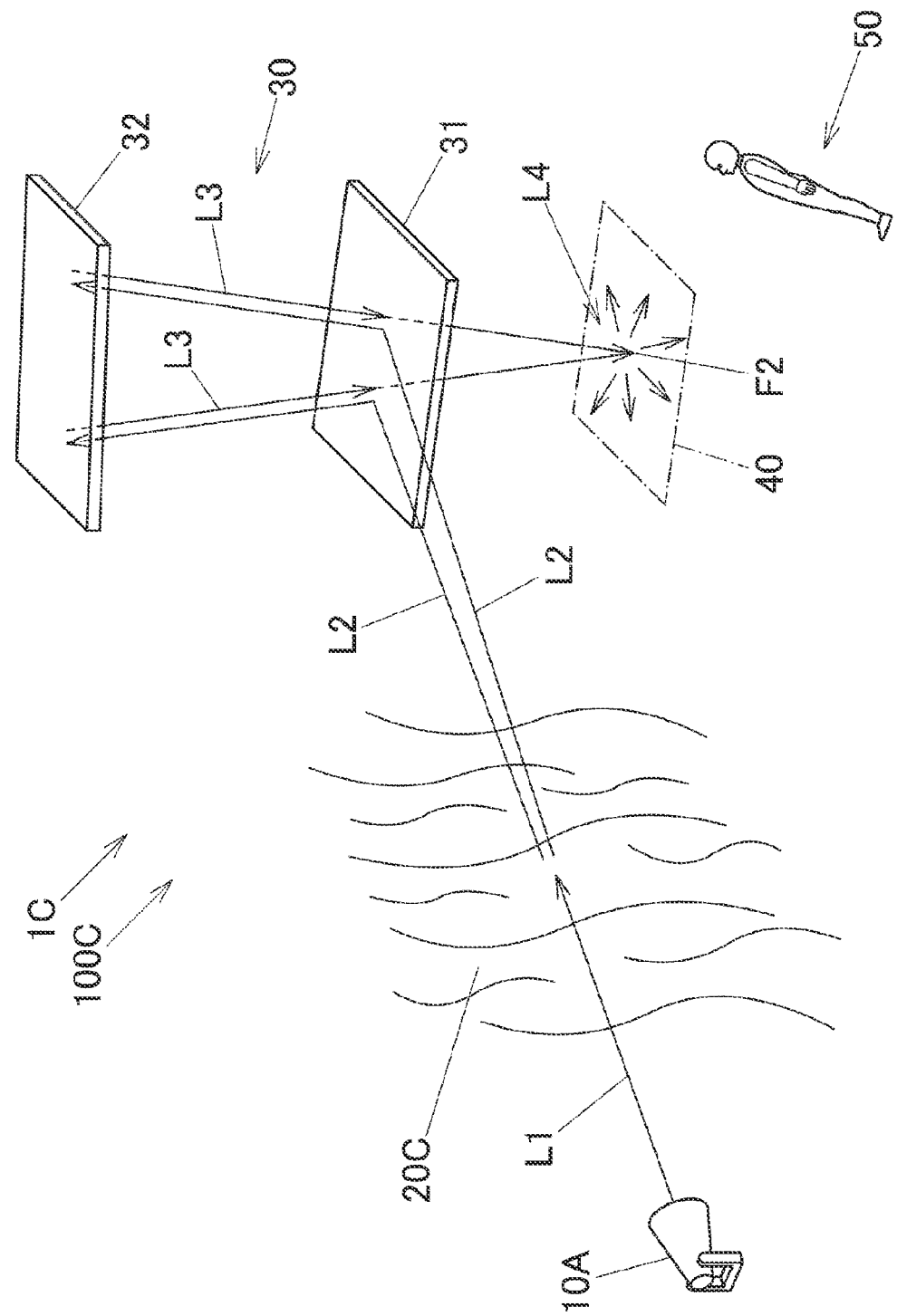
FIG. 6 is a schematic perspective view of a spatial projection apparatus in which an optical medium that is smoke is used instead of the optical medium of the transmission-type screen, and a spotlight is used instead of the projection device in the spatial projection apparatus according to the first exemplary embodiment.

For example, as illustrated in FIG. 6, a spatial projection system 1 (spatial projection apparatus 100C) in which a spotlight 10A is used instead of the projection device and an optical medium 20C that is smoke is used instead of the optical medium 20 as a transmission-type screen can be configured. In this case, the light beam L1 emitted from the spotlight 10A is incident on the light guide optical system 30 (the beam splitter 31 and the retroreflective member 32) as the light beam L2 diffused without being formed into an image on the optical medium 20C. Then, the light beam L3 which is an emitted light from the light guide optical system 30 is formed into an image at focal point F2 of the spatial imaging unit 40. Here, the spotlight 10A is used instead of the projection device 10. However, it is a matter of course that the projection device 10 may be used as it is.

As described above, the spatial projection systems 1, 1A, 1B, and 1C and the spatial projection apparatuses 100, 100A, 100B, and 100C described according to each of the present exemplary embodiments include the optical media 20, 20A, 20B, and 20C to which a projected light is diffused, and the light guide optical systems 30, 30A, 30B, and 30C that guide light beams diffused by the optical media 20, 20A, 20B, and 20C and form an image on the spatial imaging unit 40. As a result, the projection image 2a can be displayed with high luminance, and the spatial projection image 4a can also be displayed clearly with high luminance. In addition, in a configuration in which the projection image 2a is formed by the projected light P1, a size and shape of the spatial projection image 4a can be easily changed. Thus, it is possible to perform spatial projection with a simple configuration and a high visual effect.

In addition, the optical media 20 and 20A are transmissive screens, and the optical medium 20B can form an image of a projected light on the optical media 20, 20A, and for visual recognition by using a reflective projector screen.

In addition, the optical media 20 and 20A are transmissive members that form an image of the projected light P1 on the first surface 21 side, and diffuse and emit light beams from the second surface 22 side, which is a surface opposite to the first surface 21, toward the light guide optical systems 30 and 30A. As a result, a configuration including the optical media 20 and 20A and the light guide optical systems 30 and 30A can be downsized.

Further, by forming the optical medium 20A in a three-dimensional planar shape including unevenness, a three-dimensional spatial projection image 4a can be displayed. In addition, depending on an application, an optical medium can be formed in a plate shape, a film shape, smoke-form, fluid-form, or mist-form.

The configuration has been described in which the light guide optical system 30 includes the beam splitter 31 and the retroreflective member 32, and the beam splitter 31 reflects light beams diffused and emitted from the optical medium 20 toward the retroreflective member 32 and transmits light beams reflected by the retroreflective member 32 toward the spatial imaging unit 40 side. By doing this, a wide-angle light emitted from each point light source on the projection image 2a can be easily configured.

In addition, the configuration has been described in which the light guide optical system 30A includes the light reflection member 33, and the light reflection member 33 forms an image of the light beam L2 diffused by the optical media 20, 20B, and 20C in the spatial imaging unit 40 which is a plane-symmetric position with respect to the light reflection member 33. By doing this, the light guide optical system 30A can be configured with a small number of members.

Furthermore, the spatial projection apparatuses 100, 100A, and 100B including the projection device 10 that irradiates the projected light P1 can be downsized as a whole by including a light source of the projection image 2a (4a) in the spatial projection apparatuses 100, 100A, and 100B.

Further, the projection method has been described in which the projected light P1 is formed into an image on the optical media 20, 20A, and 20B, and the light beams formed into an image and diffused by the optical media 20, 20A, and 20B is guided by the light guide optical systems 30 and 30A and reimaged on the spatial imaging unit 40. As a result, the projection image 2a can be displayed with high luminance, and the spatial projection image 4a can also be displayed clearly with high luminance. In addition, in a configuration in which the projection image 2a is formed by the projected light P1, a size and shape of the spatial projection image 4a can be easily changed. Thus, it is possible to perform spatial projection with a simple configuration and a high visual effect.

Note that the present exemplary embodiments described above are presented as examples, and are not intended to limit a scope of the invention. These novel present exemplary embodiments can be implemented in various other forms, and various omissions, substitutions, and changes can be made without departing from a spirit of the invention. These present exemplary embodiments and modifications thereof are included in the scope and gist of the invention, and are included in the invention described in the claims and the equivalent scope thereof.

What is claimed is:

1. A spatial projection apparatus comprising:
   an optical medium that is a transmissive member having a first surface and a second surface opposite to the first surface, the optical medium is configured to:
   receive projected light on the first surface,
   form a first image of the projected light on the first surface, wherein the first surface includes a curved surface that protrudes toward a projection device and is configured to be within a depth of field of the projected light, and
   diffuse and emit, from the second surface, the projected light formed into the first image; and
   a light guide optical system configured to guide the projected light diffused by the optical medium and form a second image of the projected light on a spatial imaging unit,
   wherein the light guide optical system is configured to reimage the projected light diffused by the optical medium on the spatial imaging unit.

2. The spatial projection apparatus according to claim 1, wherein the second image is formed at a position viewable by a viewer as a spatial projection image.

3. The spatial projection apparatus according to claim 1, wherein the optical medium is formed with a plate shape, a film shape, a three-dimensional shape including unevenness, in smoke-form, fluid-form, or mist-form.

4. The spatial projection apparatus according to claim 1, wherein;
the light guide optical system includes a beam splitter and a retroreflective member, and
the beam splitter is configured to reflect light diffused and emitted from the optical medium to a retroreflective member side, and transmit light reflected by the retroreflective member to the spatial imaging unit side.

5. The spatial projection apparatus according to claim 1, wherein:
the light guide optical system includes a light reflection member, and
the light reflection member is configured to form a third image of light diffused by the optical medium on the spatial imaging unit located at a position that is plane-symmetric with respect to the light reflection member.

6. The spatial projection apparatus according to claim 1, wherein the projection device emits the projected light.

7. A spatial projection system comprising:
an optical medium that is a transmissive member having a first surface and a second surface opposite to the first surface, the optical medium is configured to:
receive projected light on the first surface,
form a first image of the projected light on the first surface, wherein the first surface includes a curved surface that protrudes toward a projection device and is configured to be within a depth of field of the projected light, and
diffuse and emit, from the second surface, the projected light formed into the first image; and
a light guide optical system configured to guide the projected light diffused by the optical medium and form a second image of the projected light on a spatial imaging unit,
wherein the light guide optical system is configured to reimage the projected light diffused by the optical medium on the spatial imaging unit.

8. The spatial projection system according to claim 7, wherein the second image is formed at a position viewable by a viewer as a spatial projection image.

9. A spatial projection method comprising:
receiving a projected light on a first surface of an optical medium, the optical medium being a transmissive member having the first surface and a second surface opposite to the first surface;
forming a first image of the projected light on the first surface of the optical medium, wherein the first surface includes a curved surface that protrudes toward a projection device and is configured to be within a depth of field of the projected light;
diffusing and emitting, from the second surface of the optical medium, the projected light formed into the first image;
guiding the projected light diffused by the optical medium using a light guide optical system;
forming a second image of the projected light on a spatial imaging unit using the light guide optical system; and
reimaging the projected light diffused by the optical medium on the spatial imaging unit by the light guide optical system.

10. The spatial projection method according to claim 9, wherein the second image is formed at a position viewable by a viewer as a spatial projection image.

\* \* \* \* \*